United States Patent [19]

Gardner

[11] 4,240,567

[45] Dec. 23, 1980

[54] PUMP

[75] Inventor: James J. Gardner, Hamilton, Ohio

[73] Assignee: Nordson Corporation, Amherst, Ohio

[21] Appl. No.: 37,450

[22] Filed: May 9, 1979

[51] Int. Cl.$^3$ .............................................. B67D 5/62
[52] U.S. Cl. ............................... 222/146 HE; 418/171
[58] Field of Search ......... 141/18; 222/146 R, 146 H, 222/146 HE, 260, 261, 262; 418/170, 171

[56] References Cited

U.S. PATENT DOCUMENTS

| | | | |
|---|---|---|---|
| 2,277,270 | 3/1942 | Schmitter et al. ................. 418/32 |
| 2,522,652 | 9/1950 | Von Haase ................... 222/146 HE |
| 2,630,248 | 3/1953 | Hinz ............................... 222/258 |
| 2,655,108 | 10/1953 | Osborne ............................. 418/39 |
| 2,853,023 | 9/1958 | English ............................. 418/133 |
| 2,924,182 | 2/1960 | Blasutla et al. ................... 418/133 |
| 3,031,106 | 4/1962 | Hooker .......................... 222/146 H |
| 3,113,705 | 12/1963 | Weitzel ............................. 222/389 |
| 3,202,101 | 8/1965 | Tinker et al. ....................... 417/53 |
| 3,282,469 | 11/1966 | Skonberg ....................... 222/146 H |
| 3,412,903 | 11/1968 | Van Riper, Jr. ................ 222/146 H |
| 3,637,111 | 1/1972 | McCreary ...................... 222/146 H |
| 3,964,645 | 6/1976 | Scholl ........................... 222/146 HE |
| 4,073,409 | 2/1978 | Gardner et al. ............... 222/146 HE |

*Primary Examiner*—Frederick R. Schmidt
*Attorney, Agent, or Firm*—Wood, Herron & Evans

[57] ABSTRACT

An improved cartridge-type pump provides inlets on each side of the pump to increase capacity from a material source disposed at one end of the pump housing. Moving pump gears are removed from a pump body to a lower end thereof and wear plates and gear ring define, in combination with a surrounding pump housing, upper and lower inlets of high volume capacity, respectively communicating between the material source at one end of the pump and both inlets of the pump. Increased intake to the upper inlet is provided, without internal machining of inlet ports in the lower end plate or the gear plate, and even though the gear plate is partially disposed in the housing sleeve between the upper inlet and the material source.

18 Claims, 9 Drawing Figures

PUMP

This invention relates to pumps and more particularly to improved pumps for pumping and dispensing viscous materials such as hot melt adhesives.

The pumping of viscous materials presents special problems, particularly where high pump capacity is required and the materials must be converted from a relatively solid state to a more viscous state which can be pumped. The pumping and dispensing of hot melt adhesives are one area where these problems particularly arise.

For example, hot melt adhesives are typically supplied in 55 gallon drums wherein the adhesive material is in a solid state. It is necessary to both remove the adhesive for use and at the same time to heat it for application. One solution to this problem is provided in U.S. Pat. No. 4,073,409 where a follower apparatus is pressed into the open top of an adhesive drum. The follower apparatus includes a heated platen means for heating the adhesive to a more liquid state, where it nevertheless remains highly viscous, and a pump for pumping the heated adhesive out of the drum. That patent and its disclosure are herewith incorporated herein by reference for background and disclosure purposes.

While that patent discloses a useful pump, it is now desired to provide an improved pump for use in such apparatus which can handle even highly viscous materials at relatively high capacities and which can be more easily serviced.

In the pump shown in the patent, it will be noted that the pump fits closely in the housing or sleeve in which it resides and that only one end of the pump is open to the hot melt through a quartered portion in the end plate and the pump body. The openings provided have a direct effect on the capacity of the pump since its output capability depends to a large extent on the intake capability. In cartridge-type pumps of this nature, where the pump body is disposed in a sleeve, such intake is primarily limited to the bottom of the pump which is exposed to the material to be pumped only at one end of the pump adjacent the sleeve.

It will also be noted that the pump gears are disposed within by the pump body, and that the pump body wears as the gears operate. Once the tolerances are exceeded, the entire pump body must be replaced. Hardening of the wear surfaces on the pump body reduces the frequency of replacement, but depending on usage, occasional replacement is required.

Finally, it will be noted that the pump requires a thrust bearing which generally is shimmed to provide the appropriate tolerance between the gears and the pump body on the gear's upper side, and the gears and the end cap on the gear's lower side.

Accordingly, it has been one objective of this invention to provide an improved pump for handling viscous materials.

A further objective of the invention has been to provide an improved pump of the cartridge-type with increased intake capacity.

A further objective of the invention has been to provide an improved pump of the cartridge-type which provides improved ease of service for all wear parts.

A further objective of the invention has been to provide an improved pump for use in a hot melt adhesive pumping and dispensing apparatus of the type disclosed in U.S. Pat. No. 4,073,409.

To these ends, a preferred embodiment of the invention includes a cartridge type pump with substantially improved intake capacity. Inlets are provided to both upper and lower sides of the pump from the source of material adjacent the end of the sleeve in which the pump is located. This double inlet feature is accomplished, according to the invention, in a cartridge type gear pump by providing upper and lower inlet plates defining inlets on each side of a separate gear plate housing the pumping gears at the lower end of the pump body, and by spacing the circumference of the inlet plates and gear plate from the sleeve in which the pump body resides to provide a passageway communicating the material at one end of the sleeve to a pump inlet within the sleeve. Thus, material at one end of the pump housing's sleeve is transmitted to inlets on both sides of the pumping gears as the pump and follower is forced into the material.

Also, the gear plate in the preferred embodiment is relieved in an area in register with relieved arcuate segments of the inlet plates which define respective inlets to the pump. The relieved portion of the gear plate defines, with the surrounding sleeve, an even greater passageway area communicating between the material at an end of the sleeve and the inlet on the top side of the pumping gears.

Since the pumping gears have been removed from within the pump body, they do not wear the pump body. Rather a gear ring rides in a bore through the gear plate. When wear tolerances are exceeded, it is only necessary to replace the relatively small gear plate and not the entire pump body.

Accordingly, by providing a pump inlet on both sides of the pumping gears even though the upper sides of the gears and the surrounding gear plate are disposed at least partially within a pump housing sleeve, the pump's capacity to handle high viscosity materials at greater pumping capacities is significantly increased over prior art devices where the top side of the pumping gears were not accessible to the material at the lower end of the housing sleeve. The invention thus provides a means for providing in a cartridge type pump a significantly increased intake capacity from one end of the sleeve in which the pump is located.

Further, maintenance and replacement costs are substantially reduced in view of the fact that major wear surfaces have been transferred from the more expensive pump body to less costly gear plates. This has been accomplished while at the same time the increased pump intake capacity at both sides of the pump is maintained even though the gear plate is disposed between the upper intake area and the material to be pumped.

Also, it will be noted that the flat gear plate can be machined in relation to the gears to provide appropriate tolerances so that no assembly shimming is necessary.

These and other objects and advantages will become even more readily apparent from the following detailed description of preferred and alternate embodiments of the invention and from the drawings in which.

Figure 1:
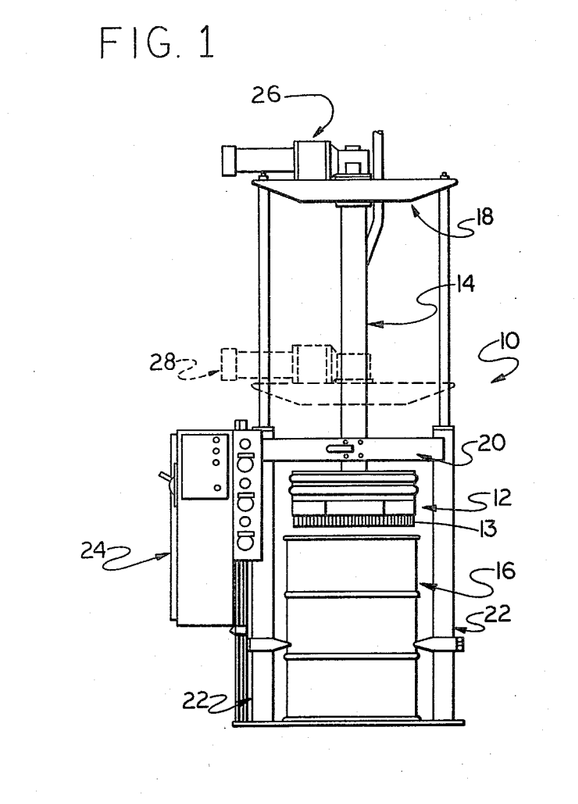
FIG. 1 is an elevational view of one apparatus in which the pump according to the invention is used.

Turning now to the drawings, FIG. 1 depicts a pumping and dispensing apparatus 10 with particular utility for pumping and dispensing viscous materials such as, for example, hot melt adhesives. The pumping and dispensing apparatus 10 is more particularly described in U.S. Pat. No. 4,073,409, which is incorporated herein by reference.

Of course, while the invention described and claimed herein constitutes an improved pump which has particular utility in the pumping and dispensing apparatus 10 for pumping and dispensing hot melt adhesives, it should also be appreciated that the invention herein is useful in other environments for pumping many different kinds of material. The invention described herein will be particularly described with reference to the hot melt pumping and dispensing apparatus as shown in FIG. 1, since the pump herein offers specific utility in increasing the pump output capabilities of a cartridge-type pump when used for pumping highly viscous materials such as liquified hot melt adhesive.

Continuing with a brief description of the hot melt pump and dispenser 10, as shown in FIG. 1, the apparatus 10 includes a follower apparatus 12 mounted on a central support tube 14 for insertion into the upper part of adhesive containing drum 16. The support tube is carried by frame members 18 and 20 for reciprocal movement as driven by air cylinders 22 into and out of the drum 16. Control apparatus 24 contains the necessary electrical and air controls for the unit.

Mounted on frame 18 is a motor 26 for driving a pump (not shown) located in the follower means 12. When the control means 24 is operated to actuate the cylinders 22, the frame 18 is drawn downwardly, pressing the follower means 12 into the drum toward a fully lowered position, such as indicated by the motor and frame member 18 in their dotted line position at 28. The specific follower apparatus 12 is provided with a heated platen means 13 which serves to melt the solid adhesive in the drum 16 into a more liquified form for pumping.

Figure 2:
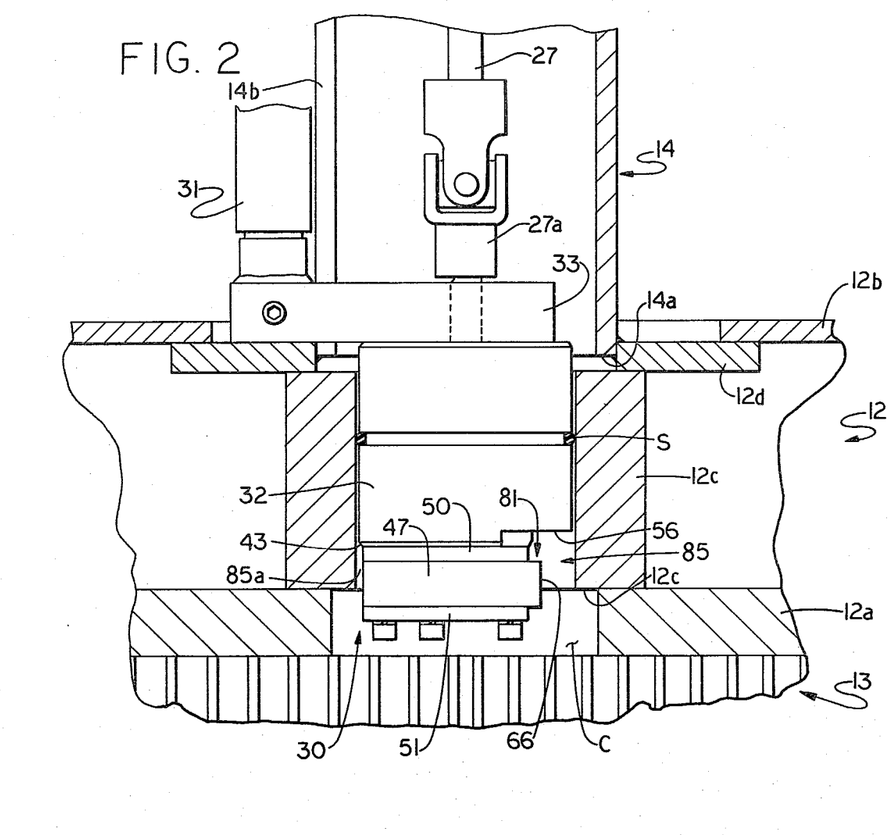
FIG. 2 is an elevational view of the preferred embodiment of the invention showing the relationship of the pump to its supporting sleeve and the apparatus of FIG. 1.

Referring now to FIG. 2, a preferred embodiment of the improved pump is illustrated at 30 in its operative relationship within the follower apparatus 12. The relationship of the pump 30 to the apparatus 12 is somewhat similar to that of the pump shown in the referenced patent, with certain particular exceptions according to the invention herein as will be described.

Basically, the follower apparatus 12 includes an annular bottom plate 12a, an upper annular cover plate 12b, heated platen means 13, and a sleeve 12c disposed between the cover plate 12b and the bottom plate 12a at the lower end 14a of the support tube 14. The follower apparatus further includes a positioning annulus 12d which is welded to the lower end of tube 14.

It will be appreciated that the bottom plate 12a has a central bore defining a space C at the lower end 12c' of the sleeve 12c. As the follower means 12 is pressed into the drum 16, the heated platen means 13 serves to partially melt the adhesive from a solidified to a more liquid form and the adhesive flows into space C as a result of the pressure exerted on the adhesive by the descending follower apparatus 12. The pump 30 is disposed within the sleeve 12c by means of the access opening 14b in the support tube 14 for pumping material from the space C into the outlet hose 31 and to an appropriate dispensing apparatus (not shown).

While pump 30 is described as residing in sleeve 12c, it will be appreciated that the term "sleeve" is used herein broadly to refer to a cylindrical housing for the cartridge-type pump. Thus the "sleeve" could be, for example, a bored opening in a plate, boss, mounting member or pump housing, a tube or other structure forming a cylindrical inner surface for housing the pump, preferably in sealing relationship.

Figure 3:
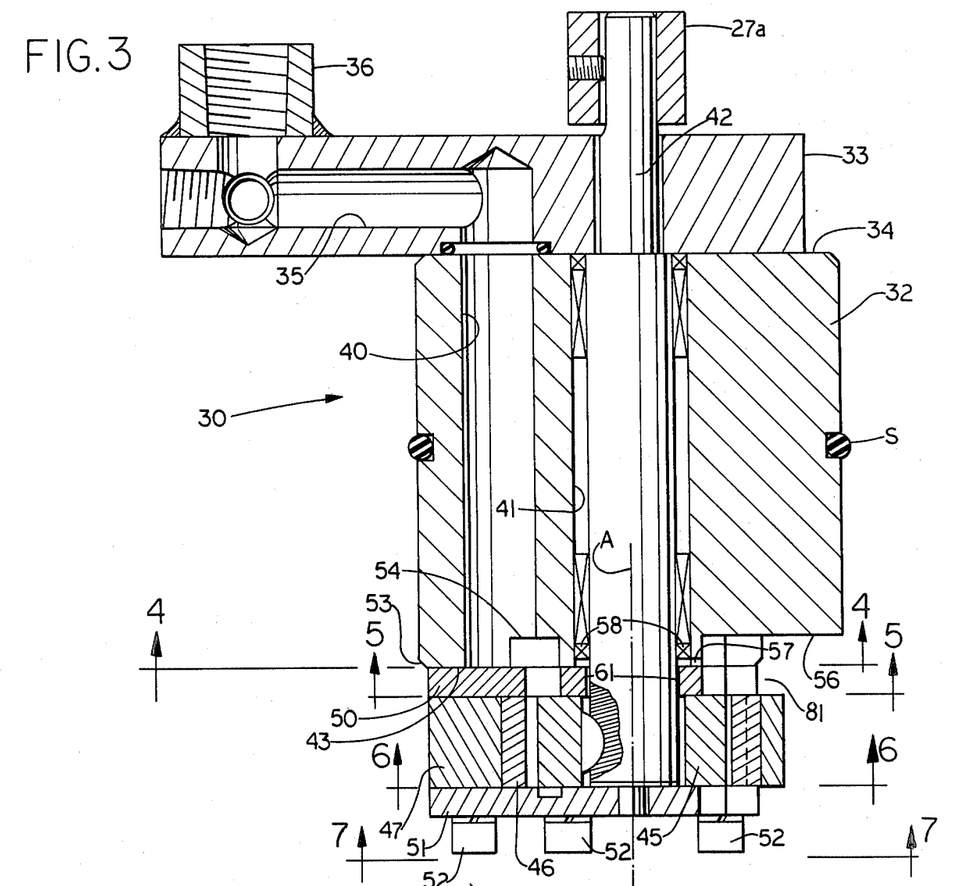
FIG. 3 is a cross-sectional view of the pump of FIG. 2.

Referring now to FIG. 3, the preferred embodiment of the improved pump will now be described. The pump 30 includes an annular cartridge-type pump body 32 operatively connected to a manifold 33 at the upper end 34 of the pump body. Manifold 33 is provided with an outlet bore 35 and an outlet fitting 36 for attachment to the outlet hose 31 (FIG. 2).

In use, pump body 32 is disposed within sleeve 12c and is sealed thereto as by O-ring seal S. Thus it will be appreciated that only a lower end of the pump housing sleeve 12c and of the pump 30 communicates with material space C.

Figures 5, 6, 7:
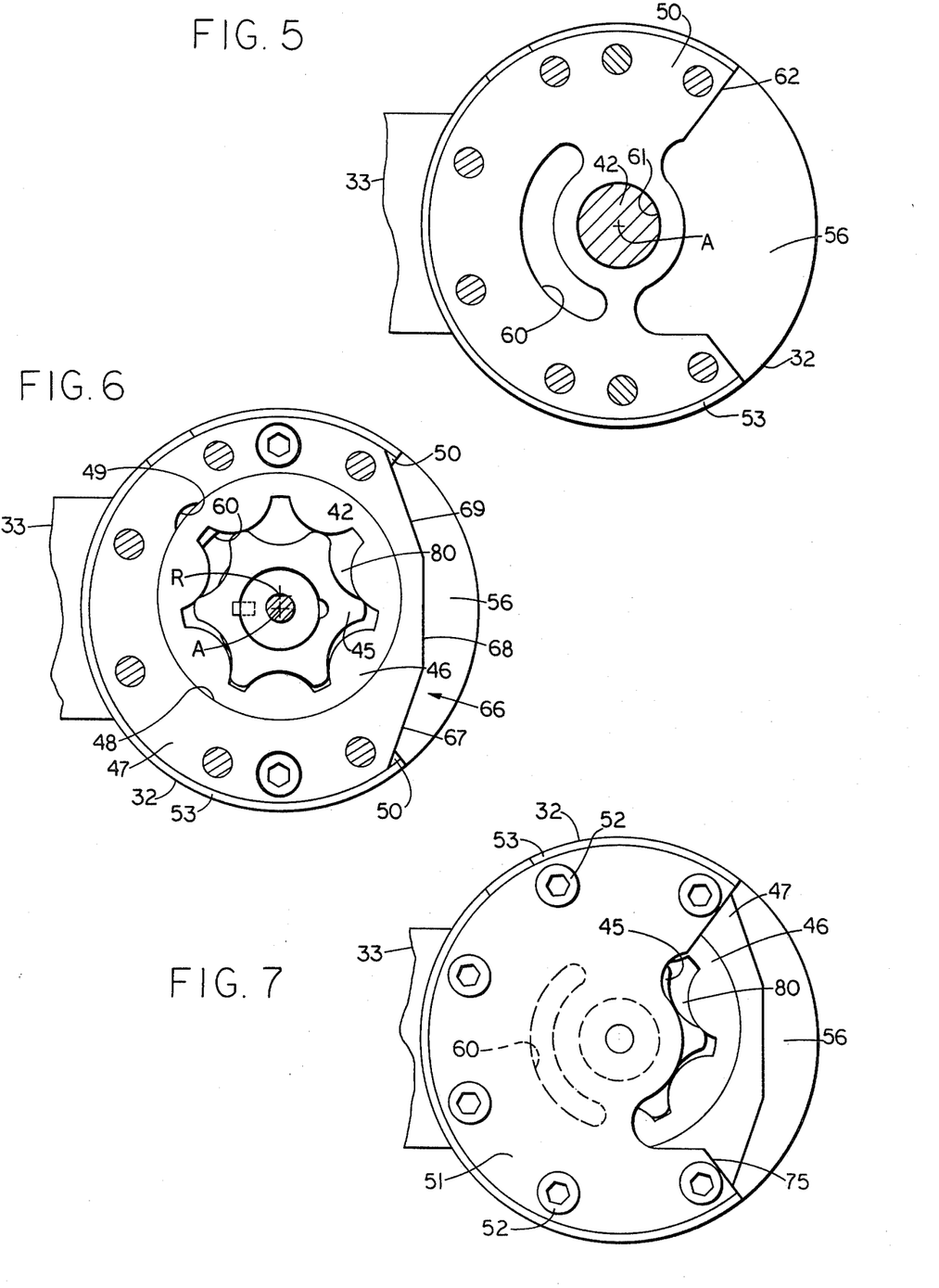
FIG. 5 is a cross-sectional view taken along lines 5—5 of FIG. 3 showing the bottom of the first inlet plate full view.
FIG. 6 is a cross-sectional view taken along lines 6—6 of FIG. 3 showing the bottom of the gear plate in full view.
FIG. 7 is a cross-sectional view taken along lines 7—7 of FIG. 3 showing the bottom of the second inlet plate full view.

Pump body 32 is provided with an outlet bore 40 and a drive shaft bore 41. A drive shaft 42 is disposed in the bore 41 about an axis of rotation A, and is connected to drive shaft 27 by means of an appropriate fitting 27a for rotation by the motor 26. Thus the drive shaft 42 extends through upper end 34 of the pump body toward and through a lower end 43 of the pump body where the drive shaft 42 is keyed to a pumping gear 45 (FIG. 6).

A gear ring 46 (FIG. 6) is associated in operative relationship with pumping gear 45 beneath the lower end 43 of the pump body 32. The pumping gear 45 and gear ring 46 are surrounded with a gear plate or spacer plate 47 which rotationally supports the gear ring 46 about an axis of rotation R, which is off-center from the axis of rotation A (FIG. 6).

Further considering FIG. 3, the pump 30 also includes an upper wear or inlet plate 50 and a lower wear or inlet plate 51. The structure comprising the upper and lower inlet plates, the gear plate, the pump gear and the gear ring are secured to the lower end of the pump body by means of appropriate bolts 52.

Figure 4:
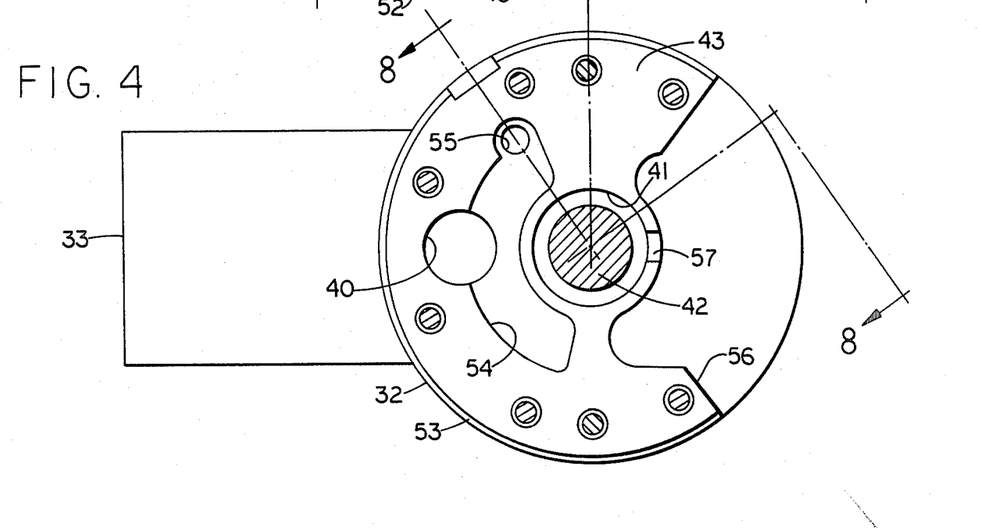
FIG. 4 is a cross-sectional view taken along lines 4—4 of FIG. 3 showing the lower end of the pump body but showing the structure full view.

Referring now to FIG. 4, the lower end of the pump body will now be described in detail. The body 32 has a beveled edge 53 through a substantial portion of its periphery. Milled into the pump body is an arcuate outlet slot 54 communicating with the outlet bore 40 and with a relief valve port 55. On the other side of the pump body from the outlet slot 54, the pump body is relieved to provide an inlet opening 56. Inlet opening 56 constitutes an arcuate segment portion throughout approximately 104°, and defines in part an upper inlet.

Finally it will be noted that a return slot or channel 57 is provided on the body 32. Should pumped material find its way above gear 45 into bore 61 (FIG. 5) of plate 50, it may translate along shaft 42 to the shaft bearing seal 58. Channel 57 provides a return to the inlet side of the pump for this material so that it does not adversely affect the shaft bearing.

Turning now to FIG. 5, the upper wear or inlet plate 50 is provided with an arcuate through slot or outlet 60 which is, when the inlet plate 50 is secured to the pump body 32, in register with the outlet slot 54 of the pump body. The inlet plate 50 further includes a central bore 61 for accommodating the drive shaft 42. Additionally, the upper inlet plate 50 is provided with an arcuate segment relieved portion 62, throughout approximately 104°. When the upper inlet plate 50 is secured to the pump body, the arcuate segment relieved portion 62 is in register with the inlet opening 56 relieved into the body 32 and further defines an upper pump inlet as will be further described.

Turning now to FIG. 6, the gear plate 47 is provided with a bore 48 about a central axis of revolution R, and thus rotationally supports the gear ring 46 for rotation about axis R, and for eccentric rotation about axis A. As seen in FIG. 6, the axis of rotation R is off-center from the axis of rotation A. Thus the bore 48 is off-center with respect to the outer circumference of the gear plate 47.

According to the invention herein, the gear plate 47 has a relieved portion 66 defined by sides 67, 68 and 69. Thus, the outer circumference of the gear plate 47 is not entirely circular, but is relieved. When the gear plate 47 is secured over the upper inlet plate 50 to the body 32, the relieved portion 66 is substantially inward of the outer circumference of the body 32 and further is in register with the inlet opening 56 in the body 32 and with the arcuate segment relieved portion 62 of the inlet plate 50.

Gear plate 47 is provided with a lube channel 49 for the purpose of maintaining a material lube about gear ring 46. Specifically, as the ring rotates, some material is forced onto its outer surface at the inlet arch. This is carried around ring 46 and tends to lubricate the ring. Excess is carried to lube channel 49 which replenishes the lube on the ring as it enters the high pressure outlet side.

Turning now to FIG. 7, the lower inlet plate 51 is substantially circular but has, as shown, an arcuate relieved portion 75 throughout approximately 104° of the inlet plate 51 and defining a lower pump inlet. When the plate 51 is in proper position over the gear plate 47 on the body 32, it will be appreciated that the arcuate segment relieved portion 75 is in register with the relieved portion 66 of the gear plate, the arcuate segment relieved portion 62 of the upper inlet plate 50, and the inlet opening 56 of the pump body 32.

From this description it will be appreciated that as drive shaft 42 rotates, it drives the pumping gear 45 to pump material from the upper and lower inlets through the pump body 32 into manifold 33. The pumping gear 45 is provided with gear vanes which are in operative association with recesses in the gear ring 46. As shown in FIG. 6, and as will be appreciated by the orientation of the upper inlet 81 which is defined by the inlet opening 56, the arcuate segment relieved portion 62 and the gear plate 47, the open recesses such as recess 80 (FIG. 6) are opened at an upper side thereof to the upper inlet area 81 and any material to be pumped in inlet area 81 can be moved under pressure into the recess 80 for pumping. As the gear 45 and the gear ring 46 rotate in a counterclockwise direction such as viewed in FIG. 6, the recess 80 is eventually closed, on the left-hand side of the apparatus, in the area communicating with the through slot 60 and the outlet slot 54. As the recess 80 continues around and closes, material within the recess 80 is pumped outwardly of the pump into the outlet bore 40 and up into the manifold 33 and to outlet hose 31. Opening and closing of the recesses are of course provided by the offset rotation of the gear ring 46 as it is driven by pumping gear 45.

At the same time it will be appreciated that the recess 80 is also opened at the bottom side of the pumping gear 45 through the inlet provided by the arcuate segment relieved portion 75 of the lower inlet plate 51. As a result, it will be appreciated that the pump as described herein includes both upper and lower inlets which substantially increase the intake capacity of the pump with respect, for example, to similar pump having only an inlet opening generally at the lower end and side of the pump (and such as shown in U.S. Pat. No. 4,073,409).

Of course, it will be appreciated that the pump body 32 is disposed within the sleeve 12c of the follower apparatus 12. Prior to this invention, the upper portion of the gear ring and pumping gear were not accessible to any material to be pumped from the space C, due to the fact that these portions of the pump were located within the sleeve 12c. It will thus be appreciated that in order to provide increased intake capacity from both upper and lower inlets in a cartridge-type pump, the invention provides passageways for the material in the space C to the upper inlet area 81 of the pump around the lower end of the pump including the lower wear plate and the gear plate. For example, the relieved portion 66, as shown in FIG. 2, is substantially spaced from the sleeve 12c in order to provide a passageway 85 leading from the material in the space C at the lower end 12c' of the sleeve 12c to the upper inlet area 81 of the pump. This passageway continues in lesser dimension all around the gear plate 47, as illustrated at 85a for example, by virtue of the fact that the upper and lower inlet plates 50 and 51 and the gear plate 47 are of lesser diameter than the inside diameter of the sleeve 12c.

Moreover, it will be appreciated that the pump 30 is positioned within the sleeve 12c so that the lower end of the pump protrudes slightly, as shown in FIG. 2, from the lower end 12c' of the sleeve. Despite this protrusion, it will be appreciated that in the preferred embodiment, however, the upper inlet plate 50 and the gear plate 47 are still disposed at least partially within the sleeve 12c. Accordingly, the relieved area 66 of the gear plate 47 and the upper pump inlet, defined by the inlet opening 56 and the arcuate segment relieved portion 62, has a substantial high volume communication with the material in the space C for introduction of the material therein into the upper inlet to the pumping gear and gear ring. Thus the pump has substantially improved intake capacity provided by means of accessing an upper intake of the pump to the material to be pumped at the lower end of the sleeve 12c, even where the gear plate 47 is primarily disposed between the material space C and the upper intake.

It should be noted in this regard that it is unnecessary to complicate the wear plates and the gear plate with additional bores and the like to the upper inlet, which would still restrict the upper inlet more than desired. The circumferential passages and upper inlet provided herein define a relatively high volume upper intake area greatly facilitating high output pumping for highly viscous materials such as liquid hot melt adhesive.

In an additional feature of the pump, it will be appreciated that the pump gear 45 and the gear ring 46 have a thickness which is substantially the same or just slightly less than the thickness of the gear plate 47. Thus, when the pumping gear and the gear ring are assembled between the plates 50 and 51, the tolerances of the moving pump parts are determined primarily by the thickness of the pumping gear, the gear ring and the gear plate. In this regard, of course, there is no shimming required for the drive shaft, for example, in order to provide the required tolerances.

Moreover, it will be noted that the gear ring 46 is supported for revolution within the bore 48 of the gear plate 47. Thus any wear provided by rotation of the gear ring 46 on the gear plate 47, wears the gear plate 47 and does not wear the pump body 32. When the wear becomes excessive so as to be out of tolerance, it is necessary only to replace, for example, the gear plate 47 (and/or wear plates 50 and 51) and it is not necessary to replace the whole body pump 32. Moreover, it is only necessary to disassemble the lower end of the pump comprising the plates 50 and 51, and the gear plate 47 for such a repair without detaching the pump body from the manifold structure or disassembling the pump body.

Figure 8:
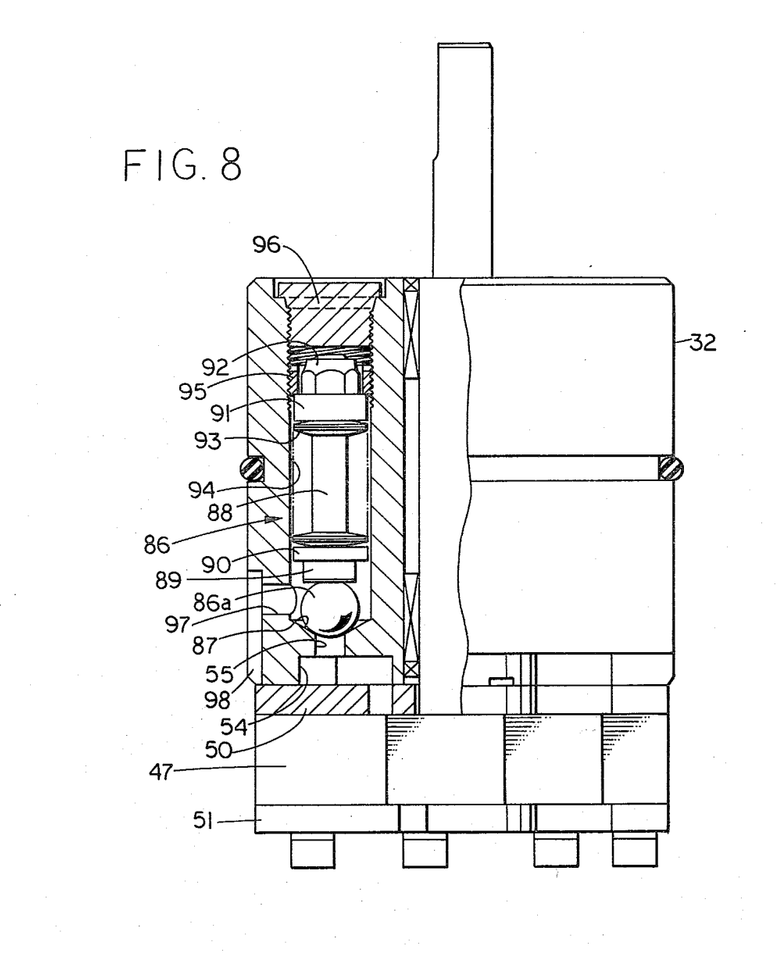
FIG. 8 is a cross-sectional view taken along lines 8—8 of FIG. 4 and showing the pump relief valve with the pump in an upright position as in FIGS. 2 and 3.

Turning now to a further description of the pump, it will be appreciated that the pump body 32 is also provided with a relief valve 86 (FIG. 8). Relief valve 86 includes a check ball 86a disposed on a seat 87. The ball 86a is pressured against the seat 87 by means of a shaft 88 having a head 89 for engaging the ball. The shaft is provided with spacers 90 and 91 and a nut 92 for compressing the spacer 91 against a column of bellville washers 93. The check valve assembly, including the ball and the shaft and bellville washer assembly are inserted into a relief valve bore 94 in the body 32. Thereafter, a locking ring 95 is threaded into the bore 94 for pressuring the bellville washers and adjusting the relief pressure of the relief valve. A plug 96 is then inserted into the bore 94 for covering the end of the bore.

The ball 86a serves to cut off the port 55 from the return port 97. As shown, the return port 97 communicates with a relieved area 98 in the side of the body 32, and thus with the passageway 85 and the adhesive material. Should the output pressure of the pump exceed that set by the relief valve apparatus 86, the ball 86a is unseated and material in the outlet slot 54 can be communicated through the relief valve back to the inlet material via passageway 85.

Accordingly, in use, the pump described herein is disposed in a follower apparatus 12 which is lowered into an adhesive containing drum. The follower apparatus heats the adjacent adhesive to a liquid but nevertheless viscous state. As the follower apparatus is pushed into the drum, it presses the adhesive from space C both into the lower inlet defined by plate 51, and into passageways 85 and 85a and thus to upper inlet 81. Adhesive in thus pressed into the gear pumps and is pumped outwardly through outlet slots 60 and 54, bores 40 and 35 and hose 31 for application.

Figure 9:
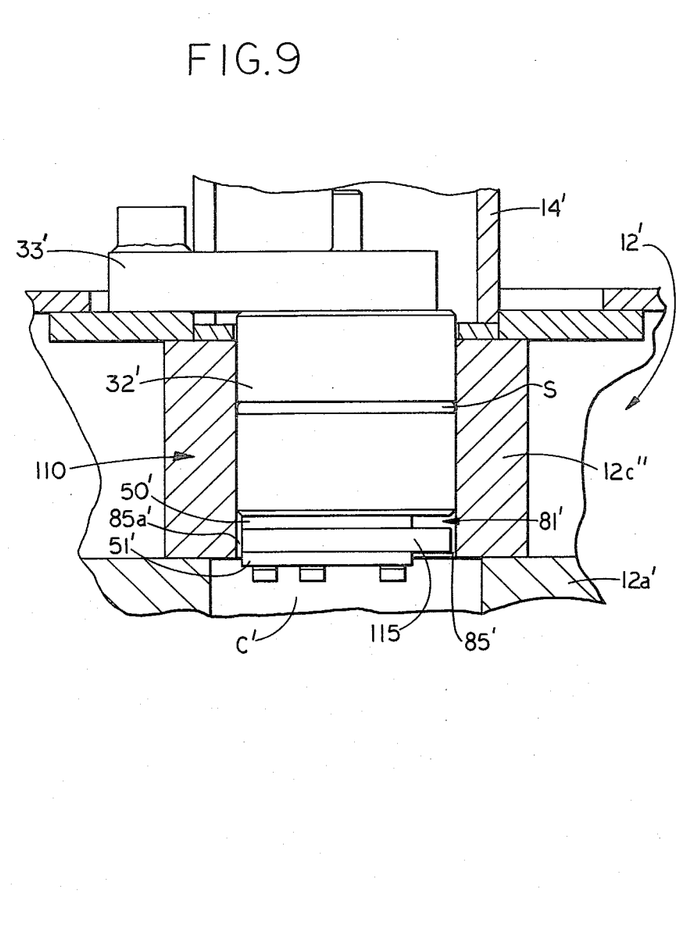
FIG. 9 is an elevational view similar to FIG. 2 but showing an alternate embodiment of the invention.

Turning now to a description of an alternate embodiment of the invention, FIG. 9 depicts an alternate pump 110 which is particularly useful in pumping less viscous liquids and at somewhat lower capacities. For example, the pump of the preferred embodiment is capable of pumping approximately three-fourths cubic inches of highly viscous hot melt adhesive per revolution of pump gear 45. The alternate embodiment on the other hand, is designed for a lower capacity of about one-half that volume. Also, it should be noted that while this alternate embodiment is capable of handling highly viscous materials, it has primary utility for lower viscosity materials or for pumping materials at a reduced capacity. Nevertheless, the inlet access area to the pump gear is approximately the same in the alternate embodiment as in the preferred embodiment.

The alternate pump 110 is similar throughout the upper manifold and pump body area. Thus the manifold, pump body and similar parts are identified with prime numbers similar to those identifying features of the preferred embodiment. For example, at the lower end of the pump, the inlet plates 50' and 51' are similar to the inlet plates of the preferred embodiment.

The major difference between the pump 110 of the alternate embodiment and pump 30 of the preferred embodiment resides in the gear plate 115. As shown in FIG. 9, the gear plate 115 is substantially thinner than the gear plate 47 of the preferred embodiment. Moreover, the gear plate 115 is circular throughout its periphery and does not have a relieved portion which would correspond to relieved portion 66 of the gear plate 47, for example. It will be appreciated, however, that the gear plate 115 is retained at a diameter which is less than that of the pump body 32'.

Moreover, it will be appreciated that for the materials contemplated and the capacities for this pump, it will not be necessary to relieve the pump body 32' in the area of the inlet area 81'. Such a relief corresponding to the relieved portion 56 of the pump body 32 of the preferred embodiment could be provided if desired.

It will be further appreciated that the reduced diameter of the gear plate 115 defines, with the lower end of the sleeve 12c', passageways 85' and 85a', for example, between the material space C' and the upper inlet area 81'. Thus the material in the space C', when the follower apparatus 12' is pressed against the material, is transmitted up through the passageway 85' into the upper inlet area 81' and from there into an upper inlet to the pumping gear and gear ring, not shown. Of course, the thickness of the pumping gear and the gear ring corresponds with proper tolerances to that of the gear plate 115 in this embodiment.

It will further be noted with respect to FIG. 9 that the gear plate 115 is located within the sleeve 12c''. Thus it will be appreciated that in this alternate embodiment as well, the structure as described provides both upper and lower inlets on both sides of the gear pump even when the gear pump 110 is located within the sleeve 12c'' which communicates with a material space C' only at one end of the sleeve, and even without internal inlet passageways. The remaining features and advantages of the pump 30 are found as well in this alternate embodiment provided by the pump 110.

Accordingly, it will be appreciated that the invention provides an improved pump with particular utility for pumping highly viscous material, such as liquid hot melt adhesive, at relatively high capacities by means of providing inlets on both sides of the pump to a common source of material to be pumped and even in a cartridge-type pump structure wherein only one end of the pump as a whole communicates with the heated material space. Moreover, it will be appreciated that the invention provides improved ease of repair and wear characteristics and improved ease of assembly.

These and other modifications and advantages will become readily apparent to those of ordinary skill in the art without departing from the scope of invention, and I intend to be bound only by the claims hereto.

I claim:

1. An improved cartridge pump for a sleeve having one end communicating with material to be pumped, said improved pump comprising:
   a pump body disposed in said sleeve, and having a lower end disposed near said one end of said sleeve,
   a pump ring and a pump gear operatively combined at said lower end of said pump body for pumping material,
   a gear plate peripherally surrounding said ring,
   a first inlet plate between said pump body and said gear plate, and partially defining a first pump inlet on an upper side of said pump ring and pump gear,
   a second inlet plate disposed on an opposite side of said gear plate from said first inlet plate, and defining a second pump inlet on a lower side of said pump ring and pump gear, and
   said first inlet plate and said gear plate being at least partially disposed within said sleeve, said gear plate having outer peripheral surfaces spaced from the surface of said sleeve and, defining therewith a material inlet passageway operatively communicating between the inlet defined in said first inlet plate and said material at said one end of said sleeve.

2. Apparatus as in claim 1 wherein said first inlet plate includes an arcuate segment relieved portion defining, with said pump body and gear plate, a first pump inlet communicating with said passageway.

3. Apparatus as in claim 2 wherein said pump body includes an arcuate segment relieved portion in register with the relieved portion of said inlet plate and partially defining said first pump inlet.

4. Apparatus as in claim 2 wherein said first inlet plate further includes an arcuate through slot defining a pump outlet spaced from said first pump inlet and communicating with an outlet bore in said pump body.

5. Apparatus as in either claim 2, 3 or 4 wherein said gear plate is relieved in a peripheral area in register with said arcuate segment relieved portions providing a wider passageway, at said first inlet, than the passageway between the remainder of said gear plate and said sleeve.

6. Apparatus as in claim 2 wherein said second inlet plate includes an arcuate segment relieved portion defining a second pump inlet in register with said first pump inlet.

7. Apparatus as in claim 6 wherein said gear plate is relieved in an area substantially in register with said first and second pump inlets.

8. Apparatus as in claim 1 wherein said second inlet plate includes an arcuate segment relieved portion defining a second pump inlet.

9. Apparatus as in claim 1 wherein said sleeve is disposed in a follower means for engaging and pressuring fluid to be pumped, said one end of said sleeve communicating with material to be pumped, and said material flowing around said second inlet plate and said gear plate to said first pump inlet when said follower means is urged against said material.

10. Apparatus as in claim 9, wherein said follower means includes a heated platen means for heating said material to be pumped.

11. Apparatus as in claim 1 wherein said first inlet plate defines a pump outlet communicating with an outlet bore in said pump body and further including a pressure relief valve in said pump body, said relief valve operatively communicating with said pump outlet on one side thereof and with said material to be pumped on the other side thereof.

12. Apparatus as in claim 1 wherein said pump body, said first inlet plate and said gear plate are circular, said first inlet plate and said gear plate being of lesser diameter than said pump body.

13. Apparatus as in claim 12 wherein said second inlet plate is also circular and is of lesser diameter than said pump body.

14. An improved cartridge pump for a hot melt adhesive dispenser having follower means for insertion into an adhesive containing drum to heat the adhesive and to force it into said pump, said follower means mounted on a support tube and including a sleeve disposed at one end near a lower end of said tube and having a lower end disposed near a heated platen member of said follower means and in communication with heated material to be pumped, said improved pump comprising:
   a pump body disposed in said sleeve, and having a lower end disposed near said lower end of said sleeve,
   a pump ring and a pump gear operatively combined at said lower end of said pump body for pumping material,
   a gear plate peripherally surrounding said ring,
   a first inlet plate between said pump body and said gear plate partially defining a first pump inlet on an upper side of said pump ring and said pump gear,
   a second inlet plate disposed on an opposite side of said gear plate from said first inlet plate and defining a second pump inlet, on a lower side of said pump ring and said pump gear, and
   said first inlet plate and said gear plate being at least partially disposed within said sleeve, said gear plate having outer peripheral surfaces spaced from the surface of said sleeve and defining therewith a material inlet passageway operatively communicating between the inlet defined in said first inlet plate and said material at said lower end of said sleeve.

15. An improved pump for use in an apparatus for pumping viscous materials wherein said apparatus comprises a follower means which is mounted on a support tube and is forced against material to be pumped, and a pump operatively associated with the follower means for pumping material to be dispensed, said improved pump comprising:
   a pump body,
   a pump driving shaft extending through said body and secured at a lower end to a pump gear,
   a rotatable gear ring operatively surrounding said pump gear and cooperating therewith to pump material when said gear is rotated,
   a gear plate surrounding a periphery of said gear ring and having a gear ring engaging bore therein,
   an upper inlet plate between said pump body and said gear plate partially defining an upper inlet to said pump gear and gear ring,
   a lower inlet plate on the opposite side of said gear plate from said upper plate, defining a lower inlet to said pump gear and gear ring, and
   said pump being disposed in a sleeve adjacent a lower end of said tube, a lower end of said sleeve communicating with material to be pumped, and said gear plate being partially within and spaced from said sleeve and defining, with said sleeve, passageways around the gear plate to said upper inlet plate from said lower end of said sleeve, said pump receiving material to be pumped on both sides of said gear plate from adjacent said lower end of said sleeve.

16. An improved pump for use in an apparatus for pumping viscous materials wherein said apparatus comprises a follower means which is mounted on a support tube and is forced against material to be pumped, and a pump operatively associated with the follower means for pumping material to be dispensed, said improved pump comprising:

a pump body having a drive bore therethrough, a pump driving shaft disposed on an axis of rotation in said drive bore and secured at a lower end to a pump gear, a rotatable gear ring operatively surrounding said pump gear and cooperating therewith to pump material when said gear is rotated, a gear plate surrounding a periphery of said gear ring and having a gear ring engaging bore therein, said gear ring engaging bore having a central axis offset from said axis of rotation, an upper inlet plate between said pump body and said gear plate and partially defining an upper inlet to said pump gear and gear ring, a lower inlet plate on the opposite side of said gear plate from said upper plate defining a lower inlet to said pump gear and gear ring, and said pump being disposed in a sleeve adjacent a lower end of said tube, a lower end of said sleeve communicating with material to be pumped, and said gear plate being spaced from said sleeve and defining, with said sleeve, passageways around the gear plate to said upper inlet plate from said lower end of said sleeve, said pump receiving material to be pumped on both sides of said gear plate from adjacent said lower end of said sleeve.

17. An improved cartridge pump for a sleeve having one end communicating with material to be pumped, said improved pump comprising:

a pump body disposed in said sleeve, and having a lower end disposed near said one end of said sleeve, a gear pump disposed at a lower end of said body for pumping material, a gear plate peripherally surrounding said gear pump, a first inlet plate between said pump body and said gear plate, and partially defining a first pump inlet on an upper side of said gear pump, a second inlet plate disposed on an opposite side of said gear plate from said first inlet plate, and defining a second pump inlet on a lower side of said gear pump, and said first inlet plate and said gear plate being at least partially disposed within said sleeve, said gear plate having outer peripheral surfaces spaced from the surface of said sleeve and defining therewith a material inlet passageway operatively communicating between the inlet defined in said first inlet plate and said material at said one end of said sleeve.

18. An improved cartridge pump for a sleeve having one end communicating with material to be pumped, said improved pump comprising:

a pump body disposed in said sleeve, and having a lower end disposed near said one end of said sleeve, a pump means disposed at a lower end of said body for pumping material, a spacer plate peripherally surrounding said pump means, a first inlet plate between said pump body and said spacer plate, and partially defining a first pump inlet on an upper side of said pumping means, a second inlet plate disposed on an opposite side of said spacer plate from said first inlet plate, and defining a second pump inlet on a lower side of said pumping means, and said first inlet plate and said spacer plate being at least partially disposed within said sleeve, said spacer plate having outer peripheral surfaces spaced from the surface of said sleeve and defining therewith a material inlet passageway operatively communicating between the inlet defined in said first inlet plate on an upper side of said pumping means, and said material at said one end of said sleeve.

* * * * *